United States Patent [19]

Menard

[11] Patent Number: 5,302,009
[45] Date of Patent: Apr. 12, 1994

[54] METHOD AND DEVICE FOR THE BRAKING OF VEHICLES BY THE SERVO-CONTROL OF THE BRAKING TORQUE APPLIED TO A WHEEL

[75] Inventor: Christian Menard, Villennes S/Seine, France

[73] Assignee: Thomson-CSF, Puteaux, France

[21] Appl. No.: 964,055

[22] Filed: Oct. 21, 1992

[30] Foreign Application Priority Data

Oct. 23, 1991 [FR] France ................ 91 13119

[51] Int. Cl.$^5$ ................ B60T 8/00
[52] U.S. Cl. ................ 303/100; 303/93
[58] Field of Search ................ 303/93–95, 303/100, 112; 364/426.02

[56] References Cited

U.S. PATENT DOCUMENTS

| | | | |
|---|---|---|---|
| 3,508,795 | 4/1970 | Scharlack et al. | 303/104 |
| 3,967,862 | 7/1976 | Hunter et al. | 303/103 |
| 4,750,124 | 6/1988 | Lin et al. | 303/100 X |
| 4,761,741 | 8/1988 | Agarwal et al. | 303/100 X |
| 4,794,538 | 12/1988 | Cao et al. | 180/197 X |
| 4,862,368 | 8/1989 | Kost et al. | 303/109 X |
| 5,135,290 | 8/1992 | Cao | 303/100 |

FOREIGN PATENT DOCUMENTS

| | | |
|---|---|---|
| 0219023 | 4/1987 | European Pat. Off. . |
| 0252595 | 1/1988 | European Pat. Off. . |
| 2204092 | 8/1972 | Fed. Rep. of Germany . |
| WO89/10863 | 11/1989 | PCT Int'l Appl. . |

OTHER PUBLICATIONS

Tan, et al., Proceedings of the 1990 American Control Conference, vol. 2, May 23, 1990, pp. 1856–1861, "An Adaptive Sliding Mode Vehicle Traction Controller Design".

Primary Examiner—Robert J. Oberleitner
Assistant Examiner—Josie A. Ballato
Attorney, Agent, or Firm—Oblon, Spivak, McClelland, Maier & Neustadt

[57] ABSTRACT

The adherence of a wheel to a braking track is defined by a point of operation that is variable on an adherence curve as a function of the slip of the wheel. In operation, the braking torque servo control parameter utilized is the sign of the variation of the slope of the adherence curve at the above-mentioned point of operation. The braking torque is servo-controlled in such a way that this point of operation is the same as the point of maximum adherence of the adherence curve.

5 Claims, 3 Drawing Sheets

METHOD AND DEVICE FOR THE BRAKING OF VEHICLES BY THE SERVO-CONTROL OF THE BRAKING TORQUE APPLIED TO A WHEEL

BACKGROUND OF THE INVENTION

The present invention relates to a method and device for the braking of vehicles through the servo-control of the braking moment or braking torque applied to a wheel. It can be applied notably to the braking systems of all vehicles where the braking has to be done in very safe conditions.

The presently known braking control devices mainly use, as their basic parameter, the measurement of the rotational speed of the wheels. By means of this parameter and the characteristic equation of the braking, they monitor the variations in the acceleration and deceleration of the vehicle. Furthermore other devices implement a speed servo-control system to monitor the speed of the braked zone which, when compared with the reference speed of the vehicle, determines maintaining of the braked wheel at a fixed wheel slip value, the slip value being the difference between the speed of the vehicle and the rotational speed of the wheel multiplied by its radius.

In the above two cases, the performance of the device is directly related to the number of measurement signals per wheel rotation delivered by the sensor mounted on the wheel to be controlled. Depending on these applications, this number may vary from 50 to 200 signals per wheel rotation, which necessitates sophisticated sensors that are costly and not sufficiently reliable. These methods have other drawbacks. In particular, it is difficult to detect the deceleration of the speed of the wheel when the curves representing the brake friction coefficient as a function of slip have a low maximum point or are flat, like the curves encountered when the ground is wet, for example. In fact, these methods do not enable optimizing of the stopping distance but instead prevent the wheels from becoming locked. The braking efficiency of the systems made according to these methods is about 60% to 70%. This braking efficiency is defined by the ratio between the real braking distance obtained and the theoretical braking distance computed for a maximum value of a given curve of values or a given adherence curve. Finally, these methods have the major drawback of not providing a high degree of safety in the braking of vehicles. Indeed, the operations of detection or regulation are carried out based on the rotational speed of the wheels without the values of the braking torque exerted on these wheels being taken into account. Now, for dictated or instructed values of speed that are identical, the values of braking torque applied to the wheels are generally different. This creates braking dissymmetries that could result notably in loss of control of the direction of travel of the vehicles.

In order to avoid such accidents, there are methods wherein the braking is controlled by means of two systems, firstly a speed regulation loop and secondly a computer. The regulation loop provides for the fast correction of the system when there are disturbances while the computer, using information based on the speed of the braked wheel and on braking torque, computes the curve of the values of adherence between tire and the track, determines the maximum point of this curve and prepares a signal which, in modifying the instructed value of the speed regulator, leads the system to this maximum point. While the speed regulator makes fast comparisons of divergence from the instructed slip value, the computer carries out an operation of pre-regulation by taking account of the trends or slow drifts and modifies the instructed value of the regulator in order to bring operation of the system close to the maximum point of the adherence curve and keep it there. However, these methods imply linear relationships, firstly between the pressure exerted on the brake and the control current delivered by the regulator and, secondly, between the braking torque exerted on the wheel and the pressure exerted on the brake. In reality, no such linear relationships exist, for they are in fact only very approximate relationships. To overcome this drawback, there are approaches proposing a direct servo-control of the braking torque exerted on each of the wheels of the vehicle. These approaches, which are satisfactory in theory, are however very difficult to implement notably because they require the use of very sophisticated and very costly torque sensors and speed sensors in order to be made efficient.

SUMMARY OF THE INVENTION

The aim of the invention is to overcome the above-mentioned drawbacks, especially to simplify the implementation of the system for the servo-control of the braking torque.

To this end, an object of the invention is to provide a method for the braking of vehicles by the servo-control of the braking torque applied to a wheel, the adherence of the wheel to a braking track being defined by a point of operation that is variable on an adherence curve, as a function of the slip of the wheel, wherein the parameter of servo-control of the braking torque is the sign of the variation of the slope or gradient of the adherence curve at the above-mentioned point of operation, the braking torque increasing when the sign of the variation of the slope at the point of operation on the adherence curve is negative, and the braking torque decreasing when the sign of the variation of the slope at the point of operation of the adherence curve is positive.

Another object of the invention is to provide a device for the implementation of the above-mentioned method.

The main advantages of the invention are that it makes it possible to obtain maximum braking efficiency, on the order of 95%, it enables the use of simply built, low-cost speed sensors and finally it improves the safety of the vehicles by enabling the control of the braking torque on each wheel and the distribution of braking according to need.

BRIEF DESCRIPTION OF THE DRAWINGS

Other features and advantages of the invention shall appear from the following description, made with reference to the appended drawings, of which.

DESCRIPTION OF THE PREFERRED EMBODIMENT

Figure 1:
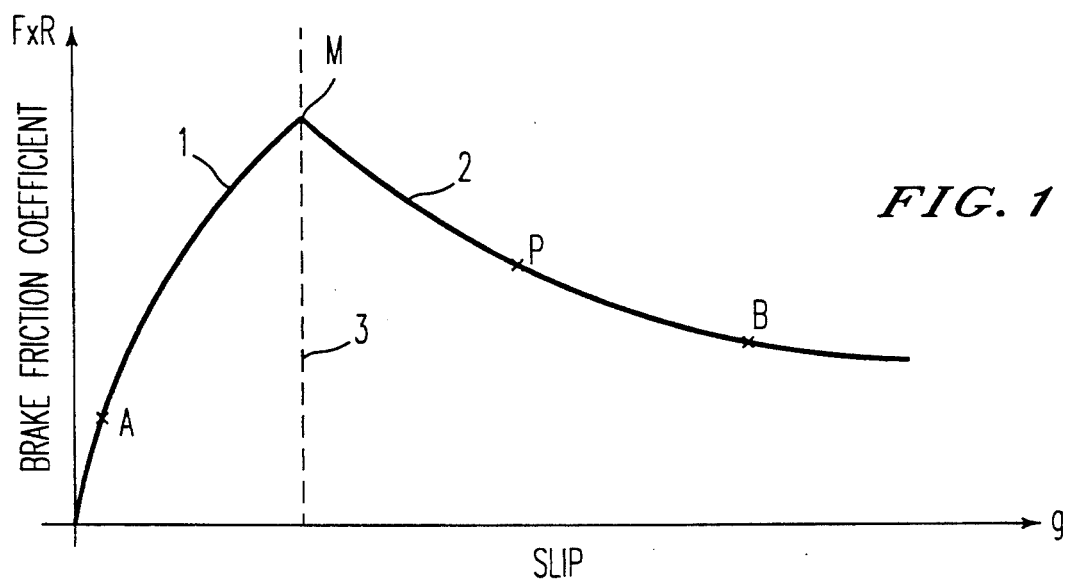
FIG. 1 shows a curve representing the adherence as a function of the skidding of a wheel.

FIG. 1 shows a curve representing the adherence or grip of a wheel with respect to a braking track as a function of slip of this wheel. This adherence is a function, at a given instant, of the surface condition of the wheel and of the track. In FIG. 1, the values of F×R plotted along the y-axis correspond to the brake friction coefficient which is the product of the multiplication of the aerodynamic drag F by the radius R of the wheel, while the values of g plotted along the x-axis correspond to the slip g of the wheel with respect t the ground, the slip g being defined by the ratio $$\frac{V - v_{wheel}}{V}$$

where V is the value of the speed of the vehicle with respect to the ground and $v_{wheel}$ is the product of the angular velocity $\omega$ of the wheel multiplied by its radius R, thus making $v_{wheel} = R\omega$. The adherence curve of FIG. 1 comprises a part 1 where the function is increasing and a part 2 where the function is decreasing. It passes through a maximum value M. All adherence curves have this shape and, depending on conditions, they are variably flat, i.e. they have a maximum value M that is variably pronounced. The two zones corresponding to the parts 1 and 2 are separated by a line 3 that includes the point M. The adherence is generally defined by the ratio $F/F_v$ where F is the drag defined above for FIG. 1 and Fv is the lifting force. However, in the examples of application of the invention, this lifting force, since it is constant, has not been taken into account in the definition of the adherence. The ratio $F/F_v$ for the definition of the adherence has been replaced by the product FR defined here above, this product is a number derived from the characteristic equation of the braking:

$$F - ff = \frac{I}{R}\frac{d\omega}{dt} \qquad \text{Equation (1)}$$

where F is the drag, ff is the braking force, I the moment of inertia of the wheel (I is constant) and $d\omega/dt$ is the derivative of the angular velocity of the wheel with respect to time. Multiplying the characteristic equation (1) by the radius of the wheel, we get equation (2) as follows:

$$FR - C = I\frac{d\omega}{dt} \qquad \text{Equation (2)}$$

where C is the braking torque applied to the wheel. Hereinafter, the adherence shall be defined by the brake friction coefficient FR.

When there is no braking, the slip g is theoretically zero. However, in reality, unwanted braking operations create a situation where there is always a slight degree of slip and the point of operation on a curve of adherence values is located for example at a point A which is not located at the starting point as indicated in FIG. 1. As soon as the braking device is activated, the point of operation shifts towards increasing values of skidding, goes through the maximum point M and travels through the part 2 of the adherence curve in passing by the point B for example, with the risk of continuing towards a situation of very great slip which is all the more dangerous as, for one and the same vehicle, the slip and, consequently, the adherence may be different from one wheel to another.

In fact, to ensure maximum braking efficiency, the point of operation of the adherence curve 1, 2 should be located at the point M, namely at the position where the adherence is the maximum.

In the case of the control of the braking of a wheel by the servo-control of the braking torque exerted on it, the adherence defined by the product F×R can indeed be known obtained from equation (2) and results in equation (3)

$$F \times R = C + I\frac{d\omega}{dt} \qquad \text{Equation (3)}$$

Thus, the measurements of the braking torque C and of the variation in angular velocity of the wheel $d\omega/dt$ give the value of FR. In the same way, the measurements of the speed of the vehicle and of the speed of the wheel give the value of the slip g. In fact, at any instant, using means for measuring the braking torque C applied to the wheel, means to measure the speed of the vehicle and the angular velocity of the wheel and computation means, it is possible to define the adherence of the wheel and hence to define a point of operation P on the adherence curve of FIG. 1. During braking operation, the purpose of the servo-control of the braking torque should be to keep, for each wheel, the point of operation on the adherence curve at the point M corresponding to the maximum value of the adherence. To this end, it is necessary to define a relationship, if possible a simple one, between the position of the operating point on the adherence curve and the value of the braking torque applied to the wheel: this is what is achieved by the method according to the invention. In fact, the computation alone of the point of operation P, defined by its coordinates FR and g, does not enable this point P to be located with respect to the point M since, in practice, the adherence curve is never known on a priori. The point M of maximum adherence is all the more not known. It is therefore necessary at least to use the first derivative of FR with respect to g. On the part 1 of the adherence curve, the first derivative of FR with respect to g, dFR/dg, is positive while, on the part 2, this derivative is negative. At the point M of maximum adherence, this derivative is positive to the right and negative to the left. There is no zero derivative at this point: this is expressed by a peak at the level of this point as is shown by the adherence curve of FIG. 1 and as is the case in general for all adherence curves encountered in reality. The sign of this first derivative dFR/dg indicates the position of the point of operation P with respect to the point M. However, notably in part 2 of the adherence curve, at the place where the first derivative is negative, the sign especially of this first derivative dFR/dg provides no information on the changing of the point of operation P towards the increasing values of slip g or the decreasing values of slip g. For all the adherence curves encountered in reality, the second derivative of FR with respect to g, $d^2FR/dg_2$ is strictly positive on the entire part 2 to the right of the point M of maximum adherence. It is on the contrary strictly negative throughout the part 1 to the left of the point M. This is not verified when the adherence curve is flat and has no maximum point. In this case, the derivatives dFR/dg and $d^2FR/dg_2$ are zero. Adherence curves that are flat are encountered, for example, in the case of tires on steel in rainy weather. The value of the second derivative $d^2FR/dg_2$ which is strictly positive indicates that the relative value of the slope of the curve is an increasing function of the slip g, while the slope is a decreasing function of the slip if $d^2FR/dg_2$ is strictly negative.

Figure 2:
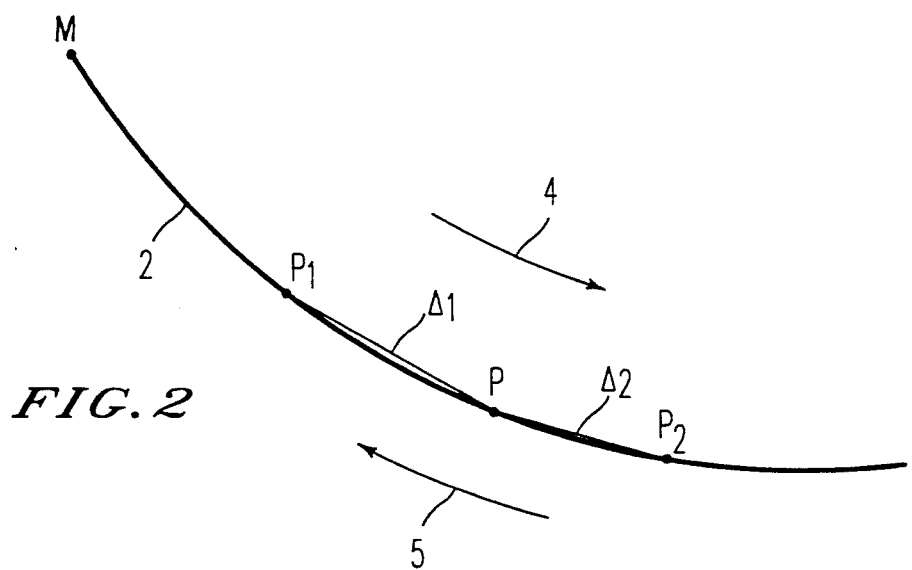
FIG. 2 shows a part of the adherence curve of FIG. 1.

FIG. 2 shows the part 2 of the adherence curve of FIG. 1 in the vicinity of the point M of maximum adherence. To servo-link the braking to the point M as a function of the braking torque exerted on the wheel, it is necessary to be able to define a relationship between the changes undergone by the point of operation P and this torque. The method according to the invention actually uses the sign of the variation of the slope at the point of operation P to determine whether the point P changes towards the point M or towards the high values of skidding. It is this information that will be used to servo-link the braking to the point of maximum adherence M by action on the braking torque exerted on each of the wheels.

Following the method of the invention, according to equation (3), the measurements of the braking torque applied to the wheel and the measurements of the speeds of the vehicle and of the wheel, a computer successively defines the coordinates of the positions of the point of operation on the adherence curve, for example the coordinates $(g_1, F_1R)$, $(g, FR)$ and $(g_2, F_2R)$ respectively for points P1, P and P2. Then, for these three successive points it computes:

$$\frac{FR - F_1R}{g - g_1} = \Delta 1 \text{ and } \frac{F_2R - FR}{g_2 - g} = \Delta 2$$

and computes $$\frac{\Delta 2 - \Delta 1}{g_2 - g_1} = S (4)$$

only the sign of which is used.

FIG. 2 illustrates the method according to the invention. The points P1, P and P2 represent three successive positions of the point of operation on the adherence curve. $\Delta 1$ and $\Delta 2$ computed here above are the values of the slopes, in terms of relative values, of the segments identified also by $\Delta 1$ and $\Delta 2$ in FIG. 2 and respectively segments between P1 and P on the one hand and P and P2 on the other hand.

The ratio $$S = \frac{\Delta 2 - \Delta 1}{g_2 - g_1}$$

expresses the variation in the slope on the adherence curve when the positions of the point of operation pass from P1 to P, and then from P to P2. Now this part is an increasing function of the slip g.

Thus, if $$S = \frac{\Delta 2 - \Delta 1}{g_2 - g_1}$$

is positive, it means that the point of operation P changes towards the increasing values of slip along the arrow 4 and moves away from the maximum point M. This is the case where P1 precedes P which in turn, precedes P2. In this case, it can be seen in FIG. 2 that the slope $\Delta 2$ is smaller than the slope $\Delta 1$ in terms of absolute value, and hence is greater in terms of relative value since these slopes are negative. If, on the contrary, the point of operation P changes towards the decreasing values of slip, i.e. along the direction of the arrow 5 towards the point of maximum adherence M, namely the case where P2 precedes P which precedes P1, the ratio $$S = \frac{\Delta 1 - \Delta 2}{g_1 - g_2}$$

defined by the computer will be negative.

The same method may be applied to the part 1 of the curve to the left of the point of maximum adherence M with the same conclusions since the first and second derivatives have signs that are reversed with respect to those of the part 2, S being in fact the sign of the variation in the slope of the adherence curve at the point of operation P. Thus, if the ratio S is positive, the point of operation P moves away from the point M and, if S is negative, it approaches it. In fact, the braking method according to the invention carries out a servo-linking of the point of operation P to the point of maximum adherence by a servo-control of the braking torque having, as its parameter, the sign of the above-defined ratio S, with S being in fact the sign of the variation of the slope of the adherence curve at the point of operation P. Finally, to control the braking of a wheel by the servo-control of its braking torque, the method according to the invention exploits the fact that the second derivative $d^2FR/dg_2$ is strictly negative on the part 1 of the adherence curve to the left of its maximum point and strictly positive on the part 2 to the right of this maximum point while the first derivative is positive to the right and negative to the left of its maximum.

The method according to the invention, which exploits only the sign of the ratio S, makes it possible to accept errors of precision in the measurement of the speeds of the vehicle, and makes it possible to simplify the speed sensors mounted on the wheels: for example, only a few measuring signals per wheel rotation are needed.

Figure 3:
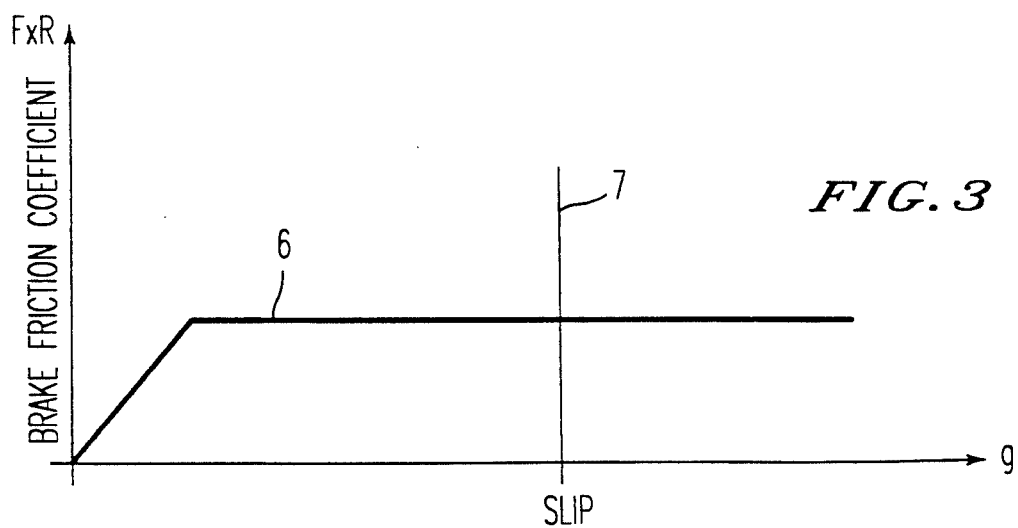
FIG. 3 shows an adherence (brake friction coefficient vs. slip) curve without a maximum point.

Should the adherence curve have no maximum point, like the curve 6 of FIG. 3 for example, a limit value 7 called a maximum slip value is memorized in the circuits of the computer for example so as to prevent the point of operation on the adherence curve from tending towards high values of slip g.

Figure 4:
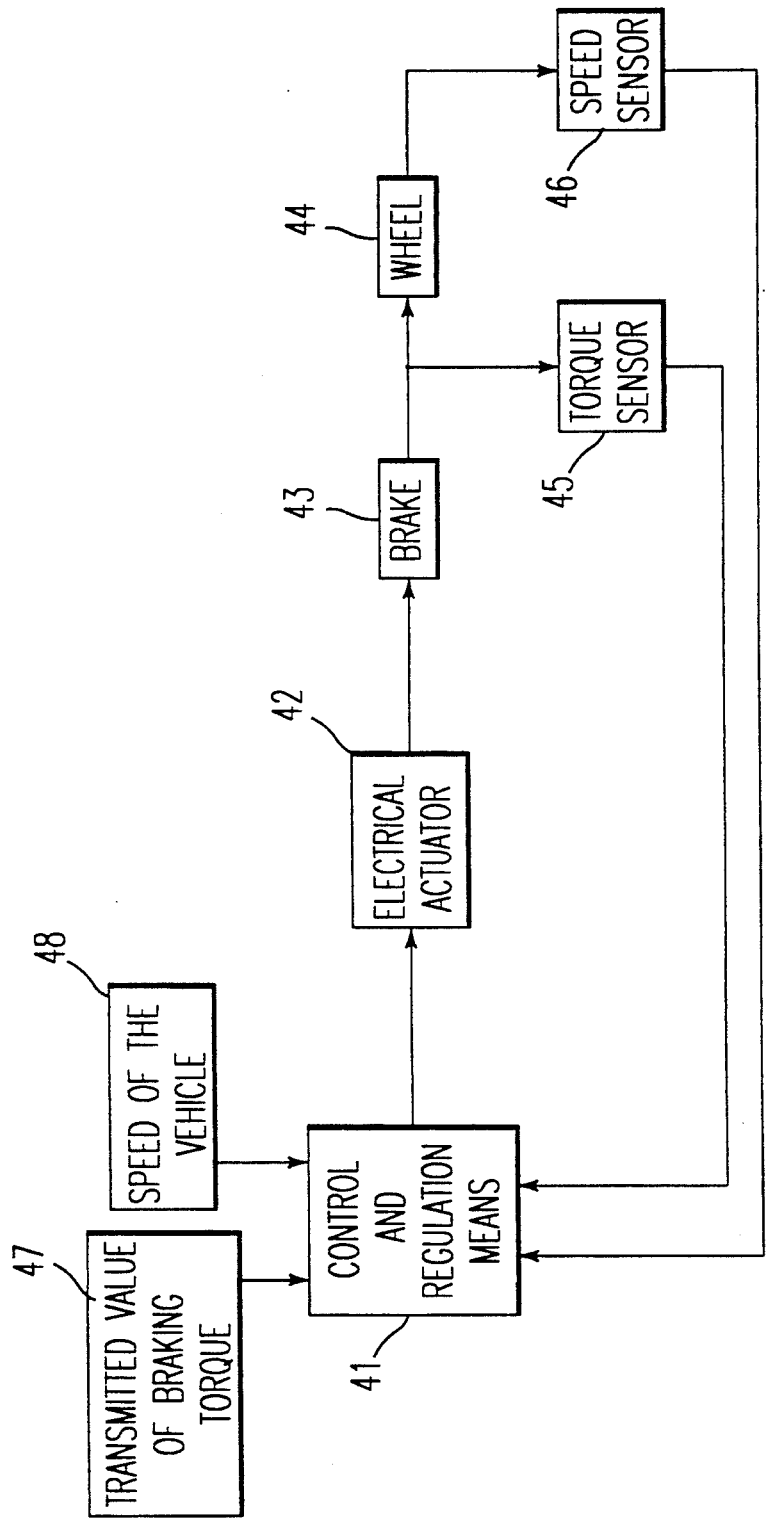
FIG. 4 is a block diagram showing a possible embodiment for the implementation of the method according to the invention and FIG. 5 shows a detailed part of the block diagram of FIG. 4.

FIG. 4 shows a block diagram of a possible embodiment for the implementation of the method according to the invention. This figure shows a device applied to a wheel. It is possible, however, to apportion the computing means among all the wheels of a vehicle. The device of FIG. 4 comprises control and regulation means 41, the output of which controls an electrical actuator 42 which actuates the brake 43, for example by means of a hydraulic element. The brake 43 exerts a braking torque on the wheel 44. A torque sensor 45, placed on the brake 43, transmits to the control and regulation unit the measurement of the braking torque exerted on the wheel 44. A speed sensor 46 placed on the wheel delivers the measurement of the speed of the wheel 44 to the control and regulation unit 41. This unit 41 furthermore takes into account the transmitted value of braking torque 47, provided by the driver of the vehicle, and the speed of the vehicle 48, delivered by a sensor external to the device of FIG. 4. These sensor may be, for example, sensors, laser beam or a tachometer.

Figure 5:
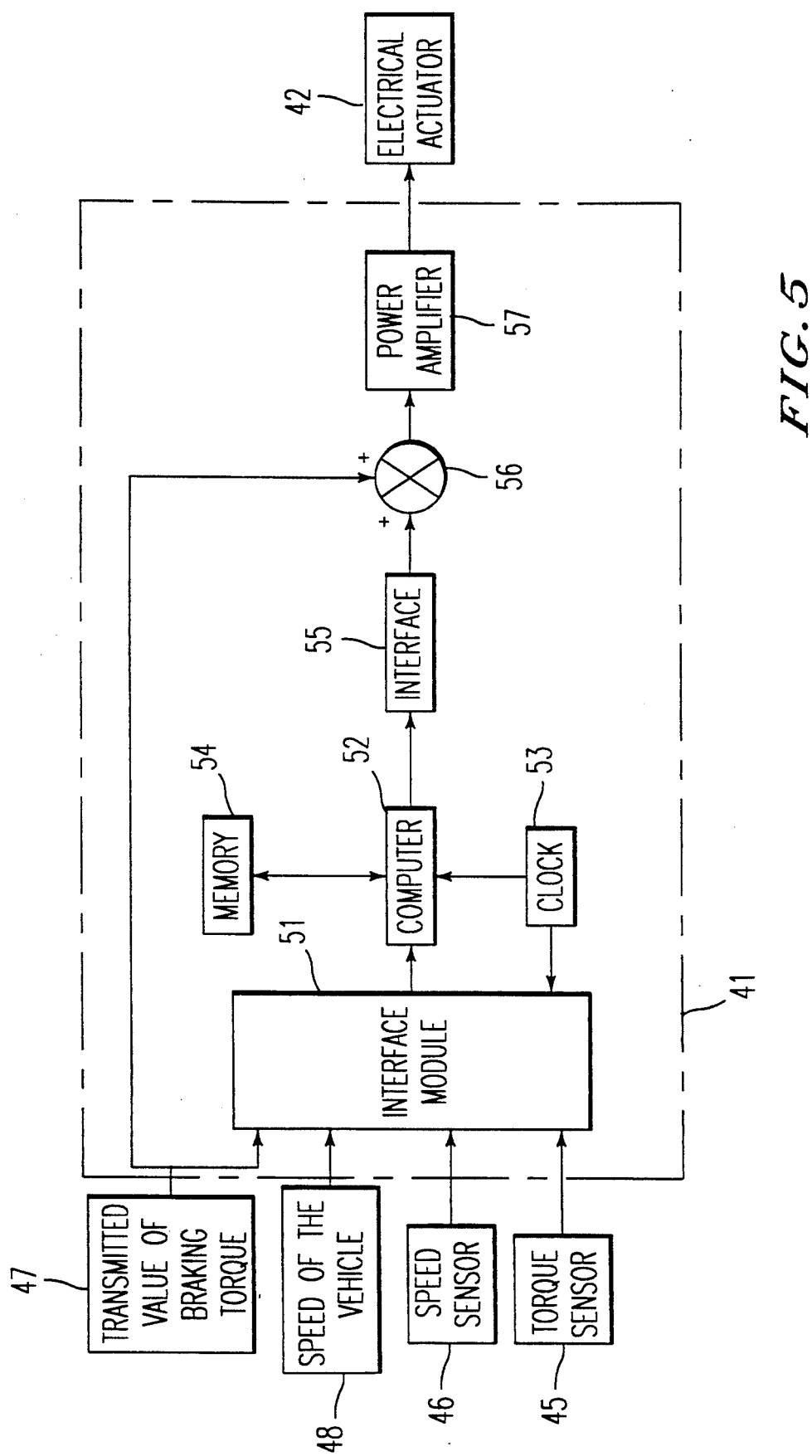

FIG. 5 shows a detailed view of a possible embodiment of the control and regulation means 41. An interface module 51 converts the information elements transmitted by the sensor 46 of the angular velocity of the wheel, the sensor 45 for sensing braking torque exerted on the wheel and the vehicle speed sensor 48, as well as the transmitted value of braking torque 47, transmitted by the driver, into digitized values that can be taken into account by the digital computer 52. This computer 52 may, for example, contain a standard arithmetical calculation unit associated with a floating operator and with a working memory. To digitize the information elements transmitted, the interface module 51 uses clock signals 53 and analog-digital converters if the signals are analog type signals or counters if they are periodic or frequential type signals. The signal coming from the sensor 46 of the angular velocity of the wheel may be processed, for example, by two methods, using measurements of frequencies in the high speed range and measurements of periods in the medium speed and low speed range. On the basis of the parameters coming from the interface module 51 and a sampling frequency defined, for example, by the clock 53, the computer defines the brake friction coefficient FR and slip g pertaining to the wheel and then, on the basis of the brake friction coefficient and slip values memorized earlier in the memory 54 for example, defines the sign of the ratio S computed according to equation (4).

The instructed value 47 of the braking torque, encoded by the interface module 51, gives the computer 52 an indication that the vehicle is in a braking phase. As soon as this instructed value appears, the circuits of the computer are re-initialized, for example, and start the computations. An interface 55, coupled to the output of the computer 52, communicates a corrective signal combined with the instructed value 47 of the braking torque by means of an adder 56. This corrective signal is a function of the sign of the ratio S transmitted by the computer 52 to the interface 55. Thus, if the sign delivered by the computer 52 is positive, for example, it means that the point of operation moves away from the maximum value M on the adherence curve, and the interface 55 applies a corrective signal to the instructed value 47 of the braking torque so as to reduce the braking torque exerted on the wheel. If the sign is negative, for example, it means that the point of operation P changes towards the maximum adherence value, the corrective signal delivered by the interface 55 does not modify the instructed value 47 of the braking torque in such a way as to permit the movement of the operating point P, on the adherence curve, towards the point of maximum adherence M. The control signal coming from the adder 56 enters a power amplifier 57, the output signal of which directly controls the electrical actuator 42. This signal may be, for example, of the cyclical ratio type that is variable in such a way that the greater the increase in this ratio, the greater is the increase in the brake torque exerted on the wheel. In this case, this cyclical ratio is controlled by the output signal from the adder 56. The computation means of the device, which are shown in FIGS. 4 and 5, namely the computer 52, the memory 54 and the clock 53 may be apportioned, for example, among several devices for braking the wheels of one and the same vehicle.

What is claimed is:

1. A method for braking at least one wheel of a vehicle by servo-control of the braking torque applied to said at least one wheel, which comprises:

determining the adherence of the wheel to a braking track by using a point of operation that is variable on an adherence curve as a function of slip of the wheel, a maximum value of adherence of the at least one wheel being unknown, wherein the parameter of servo-control of the braking torque consists of one of a positive and negative sign of variation of the slope of the adherence curve at said point of operation, and wherein the braking torque is increased when the sign of the variation of the slope at the point of operation on the adherence curve is negative, and the braking torque is decreased when the sign of the variation of the slope at the point of operation on the adherence curve is positive; and performing braking action of said at least one wheel based upon braking torque of the wheel, the speed of the wheel, and the speed of the vehicle.

2. The method according to claim 1, which comprises servo-controlling the braking torque in such a way that the point of operation is servo-linked to the point of maximum adherence of the adherence curve by action on the braking torque exerted on said at least one wheel.

3. A device for braking the brake of at least one wheel of a vehicle, which comprises:

an actuator coupled to the brake of the vehicle;
   a control and regulator member coupled to said actuator;
   a sensor for determining the speed of the vehicle;
   a brake torque sensor; and
   a sensor for detecting the angular velocity of the wheel which includes a connector for connecting outputs of said brake torque sensor and said sensor of the angular velocity of the wheel to inputs of the control and regulation member such that adherence of the wheel to a braking track is exclusively defined by a point of operation that is variable on an adherence curve as a function of slip of the wheel, a maximum value of adherence of the at least one wheel being unknown, and the parameter of servo-control of the braking torque comprising one of a positive and negative sign of the variation of the slope of the adherence curve at said point of operation, such that the braking torque increases when the sign of the variation of the slope at the point of operation on the adherence curve is negative and the braking torque decreases when the sign of the variation of the slope of the point of operation of the adherence curve is positive; and said control and regulation member performing braking action of said at least one wheel based upon an input from said braking torque sensor, said sensor for detecting the angular velocity of the wheel and said sensor for determining the speed of the vehicle.

4. A device according to claim 3, wherein the control and regulation member comprises at least one interface module for the digital encoding of an instructed value of the braking torque, the speed of the vehicle, the speed of the wheel and the braking torque applied to the wheel, a computer coupled to the output of the interface module, a memory coupled to the computer, a clock controlling the computer and the at least one interface module, an interface coupled to the output of the computer, an adder the inputs of which are connected to an output of the interface and to the braking torque sensor, and an amplifier coupled to the output of the adder wherein an output of the amplifier serves to control the actuator.

5. A device according to claim 3, wherein the at least one wheel comprises a plurality of wheels.

* * * * *